Patented July 30, 1940

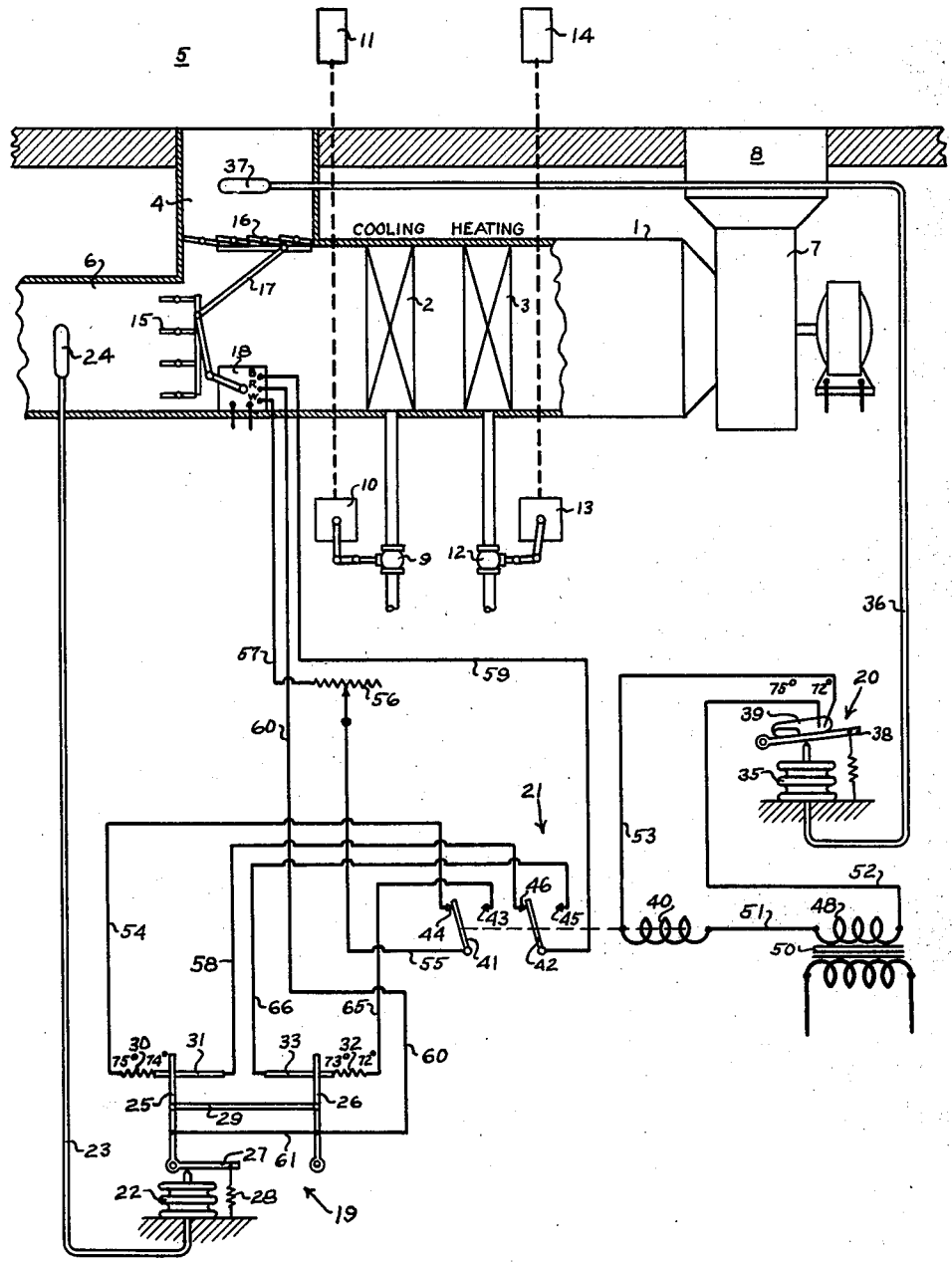

2,209,787

UNITED STATES PATENT OFFICE 2,209,787

AIR CONDITIONING SYSTEM

Francis C. Miller, Highland Park, Mich., assignor to Minneapolis-Honeywell Regulator Company, Minneapolis, Minn., a corporation of Delaware Application October 3, 1938, Serial No. 232,944

14 Claims. (Cl. 236—1)

The invention relates in general to air conditioning and more particularly to the control of the supply of fresh or outside air to conditioned spaces.

It is an object of this invention to provide a control system for a fresh air damper or other flow controller which is simple and inexpensive and which acts to control the fresh air supply in both winter and summer in a manner to utilize fresh air for conditioning the space whenever it is suitable for this purpose, and which restricts the supply of fresh air when it is more economical to pass return air to the conditioner.

A further object of this invention is the provision of an outside air controlling arrangement which utilizes an outdoor controller for varying the flow of outside air, and a space thermostat for reversing the action of the outdoor controller in accordance with space temperature.

Another object of this invention is the provision of a fresh air flow control arrangement which utilizes a pair of outside temperature influenced controllers and a device actuated in accordance with the operation of the air conditioning system for heating or cooling, for selectively placing one or the other of said controllers in operation.

Other objects will become apparent from the following description and appended claims.

For a full disclosure of my invention reference is made to the following detailed description and the accompanying drawing, the single figure of which diagrammatically illustrates a perferred form of my invention.

Referring to the drawing, reference character 1 indicates an air conditioning chamber containing a cooling coil 2 and a heating coil 3. The left hand end of the conditioning chamber 1 is connected by a return air duct 4 to the conditioned space 5 and is also connected to a fresh air inlet duct 6 which leads from a point outside the building. The right hand end of chamber 1 is connected to a fan 7 which serves to draw air through the chamber and to discharge it through a discharge duct 8 into the space 5.

The supply of cooling medium to the cooling coil 2 may be controlled in any suitable manner such as by a valve 9 which is actuated by means of a proportioning motor 10 which is controlled by a space thermostat 11. The proportioning motor 10 may be of the type shown and described in the Taylor Patent 2,028,110, this motor being adapted to be controlled by means of a potentiometer type thermostat. The thermostat 11 may be arranged in a manner to cause the motor 10 to close valve 9 completely when the space temperature is at 75° F. or below while graduatingly opening this valve and increasing the supply of cooling medium to the cooling coil 2 as the space temperature rises above 75° F. The flow of heating medium to the heating coil 3 may be controlled by a valve 12 which is positioned by a proportioning motor 13 under the control of a potentiometer type thermostat 14. The thermostat 14 may be arranged in the manner to maintain valve 12 closed when the space temperature is above 72° F. while opening this valve as the space temperature falls below 72°.

The flow of fresh and return air into the conditioning chamber 1 may be controlled by a set of fresh and return air dampers 15 and 16 which are cross-connected by a link 17 in a manner to cause these dampers to be actuated in unison, for closing the return air damper 16 upon opening of the fresh air damper 15 and vice versa. These dampers may be actuated by means of a proportioning motor 18 which is under the control of an outside thermostat 19, a return air or space thermostat 20, and a relay 21.

Referring to the thermostat 19 this thermostat may include a bellows 22 which is connected by a capillary tube 23 to a control bulb 24 which may be located in the fresh air duct 6. The bellows 22 actuates a pair of sliders 25 and 26 in unison. The actuating mechanism is diagrammatically illustrated as comprising an actuating lever 27 which is biased against bellows 22 by a spring 28. The actuating lever 27 actuates the slider 25 and this actuates the slider 26 through a connecting link 29. The slider 25 is arranged to contact a resistance 30 and a contact strip 31 while the slider 26 is arranged to contact a resistance 32 and a contact strip 33. It will be understood that the bellows 22, tube 23, and bulb 24 are charged with a suitable volatile fill for causing the pressure within bellows 22 to vary in accordance with changes in outside temperature. Upon an increase in outside temperature the bellows 22 will expand against the action of spring 28 thus shifting the sliders 25 and 26 to the left across their respective contacts and resistances. Upon a fall in outside temperature the sliders 25 and 26 will be shifted in the opposite direction. It will be noted that the resistances 30 and 32 are approximately one-half the length of the contact strips 31 and 3. This instrument is preferably so designed and adjusted as to cause the slider 25 to engage the left hand end of resistance 30 when outside temperature is at 75° F. or above. At this time the slider 26 will engage the left hand end of contact strip 33. As the space temperature falls to 74° F. the sliders 25 and 26 will shift to the left and when outside temperature is at 74° F. the slider 25 will engage the right hand end of resistance 74 and the slider 26 will remain engaged to contact strip 33. Upon fall in temperature between 74° F. and 73° F. both sliders will shift to the right across their respective contact strips. At 73° F. the slider 26 will engage the left hand end of resistance 32; and upon fall in temperature to 72° F. the slide 26 will engage the right hand end of resistance 32.

The space or return air thermostat 20 may consist of a bellows 35 which is connected by a capillary tube 36 to a control bulb 37 located in the return air duct 4. This bellows actuates a pivoted switch carrier 38 which carries a mercury switch 39. This switch 39 may be of the wide differential type. This instrument may be so designed and adjusted as to cause tilting of the mercury switch to open position when the return air temperature rises to 75° F. and to tilt this switch to closed position when the space temperature falls to 72° F.

The relay 21 may be of any suitable type and includes a relay coil 40 which actuates through a suitable armature a pair of switch arms 41 and 42. The switch arm 41 cooperates with an "in" contact and an "out" contact 44 while the switch arm 42 cooperates with an "in" contact 45 and an "out" contact 46.

Upon reference to the Taylor patent 2,028,110 it will be noted that the proportioning motor 18 is provided with three control terminals which are marked R, W, and B. This motor is adapted to assume intermediate positions in accordance with the relative values of resistance connected between terminals R and W and between terminals R and B. Therefore when terminals R and B are short-circuited without corresponding short-circuiting of terminals R and W the motor will assume an extreme position in which the fresh air damper 15 is wide open and the return air damper 16 is closed. Conversely as terminals R and W are short-circuited without corresponding short-circuiting of terminals R and B the motor 18 will assume a position in which the fresh air damper 15 is closed and the return air damper 16 is opened.

Operation

With the parts in the positions shown, the outside temperature is approximately 73.5° F. as indicated by the sliders 25 and 26 of thermostat 19 being in mid-position. Also the return air temperature is above 75° F. as indicated by the mercury switch 39 of thermostat 20 being tilted to open position. This relatively high value of space temperature has caused the thermostat 11 to open partially the cooling fluid valve 9 as shown. The thermostat 20 it will be noted controls the energization of the relay coil 40, the switch 39 and the coil 40 being connected across the transformer secondary 48 of transformer 50 by wires 51, 52, and 53. Due to the switch 39 being open the relay coil 40 is deenergized which causes the switch arms 41 and 42 to engage their "out" contacts 44 and 46.

Engagement of switch arm 41 with "out" contact 44 connects the left hand end of resistance 30 to terminal W of motor 18 as follows: resistance 30, wire 54, contact 44, switch arm 41, wire 55, rheostat 56, and wire 51 to terminal W.

Engagement of the switch arm 42 with contact 46 connects the contact strip 31 to terminal B of motor 18 as follows: contact strip 31, wire 58, contact 46, switch arm 42, and wire 59 to terminal B. Terminal R of motor 18 it will be noted is connected by wires 60 and 61 to the sliders 25 and 26. Due to the slider 25 being connected to terminal R and due to resistance 30 and contact strip 31 being connected to terminals W and B, respectively, the potentiometer controller formed of slider 25, resistance 30 and contact strip 31 is now in control of the motor 18.

With the slider 25 engaging the contact strip 31, a short-circuit is completed between terminals R and B as follows: terminal R, wire 60, wire 61, slider 25, contact strip 31, wire 58, contact 46, switch arm 42, and wire 59 to terminal B. At this time the entire resistance 30 is interposed in the circuit between terminals R and W. This short-circuiting of terminals R and B has caused the motor 18 to assume a position in which the fresh air damper is wide open and the return air damper 16 is entirely closed. It will therefore be apparent that when the space temperature is at or above 75° F. (which indicates that the cooling system is in operation) and when the outside temperature is below this value, the fresh air damper is wide open. This positioning of the damper for such conditions is desirable for the outside air condition is such that it requires less conditioning than the air returning from the conditioned space.

If outside temperature begins to rise above 74° F. the slider 25 will be shifted to the left across the resistance 30 which acts to interpose a portion of this resistance into the circuit between terminals R and B and to remove this same portion of the resistance from the circuit between terminals R and W. This will cause the motor 18 to close damper 15 and open damper 16 in proportion to the travel of slider 25 on resistance 30. When the outside temperature rises to 75° F. the slider 25 will engage the left hand end of resistance 30 which will interpose the entire resistance 30 in the circuit between terminals R and B and will substantially short-circuit terminals R and W as follows: terminal R, wire 60, wire 61, slider 25, wire 54, contact 44, switch arm 41, wire 55, rheostat 56, and wire 57 to terminal W. Due to the presence of rheostat 56 in this circuit, the motor 18 will not assume an extreme position for completely closing the damper 15, but will assume a partially open position for providing a minimum supply of fresh air at all times. By adjusting the rheostat 56 the minimum open position of the damper may be varied as desired.

From the description thus far it should be apparent that when the return air temperature is at or above 75° F. indicating that cooling of the space is desirable and that the cooling system is in operation, the fresh air damper will be wide open when the outside temperature is at or below 74° F. However, upon rise in outside temperature to 75° F. the fresh air damper 15 will be closed to its minimum position as determined by the adjustment of rheostat 56.

As the space temperature begins to fall, the thermostat 11 will cause closing of the valve 9 for placing the cooling coil out of operation when the temperature falls to 75° F. When the space temperature falls to 72° F. the thermostat 14 will cause opening of valve 12 for supplying heating medium to the heating coil 3. Also the mercury switch 39 of thermostat 20 will be tilted to closed position which will cause energization of the relay coil 40 thus bringing switch arms 41 and 42 into engagement with their "in" contacts 43 and 45, respectively. This action will disconnect the potentiometer controller formed of slider 25, resistance 30, and contact strip 31 from the motor 18. Engagement of the switch arm 41 with contact 43 will connect the resistance 32 to terminal W of motor 18 as follows: resistance 32, wire 65, contact 43, switch arm 41, wire 55, rheostat 56, and wire 57 to terminal W. Engagement of switch arm 42 with contact 45 will connect the contact strip 33 to terminal B of motor 18 as follows: contact strip 33, wire 66, contact 45, switch arm 42, and wire 59 to terminal B. Therefore when the space or return air temperature falls below 72° F. the potentiometer controller formed of slider 26, resistance 32, and contact strip 33 is placed into control of the damper motor 18.

At this time if the outside temperature is above 73° F. terminals R and B of motor 18 will be short-circuited as follows: terminal R, wire 60, slider 26, contact strip 33, wire 66, contact 45, switch arm 42, and wire 59 to terminal B. This causes the damper motor 18 to completely open the fresh air damper 15 and close the return air damper 16. This action is desirable at this time as the outside air is warmer than the return air and consequently requires less heating than the return air.

If the outside temperature begins falling below 73° F. the slider 26 will be shifted to the right along resistance 32 thus inserting a portion of this resistance into circuit between terminals R and B and decreasing the portion of this resistance which is connected between terminals R and W. This will cause the motor 18 to close damper 15 and open damper 16 proportionately to the travel of slider 26 to the right on resistance 32. When outside temperature falls to 72° F. the slider 26 will engage the right-hand end of resistance 32 which will substantially short-circuit terminals R and W as follows: terminal R, wire 60, slider 26, wire 65, contact 43, switch arm 41, wire 55, rheostat 56, and wire 57 to terminal W. Due to the presence of the rheostat 56 in this circuit the motor 18 will not completely close damper 15 which thus provides for at least a predetermined minimum flow of fresh air at all times.

From the foregoing description it should be apparent that my invention provides for closing the fresh air damper upon rise in outside temperature when the space requires cooling and for closing the fresh air damper upon fall in outside temperature when the space requires heating. This arrangement provides for supplying a maximum amount of fresh air when its condition is such that it is useful for conditioning the space. When the condition of the outside air becomes unsuitable for this purpose, the supply of fresh air is reduced to the predetermined amount required for ventilation purposes.

While throughout this description I have mentioned definite values of temperature at which the various controllers may operate, it will be understood that these values are illustrated only and that they may be varied as desired for different applications and installations of my improved system. In addition while I prefer to obtain the desired control sequence by utilizing two controllers which are selectively placed into control I also contemplate practicing my invention utilizing a single controller which is reversed in operation by suitable means. Also while I prefer to utilize a separate space thermostat for controlling the operation of the outdoor controller it will be apparent that the same thermostats which control the air conditioning apparatus could either directly or indirectly control the outdoor controller to obtain the desired results. It will be apparent that if desired, a two-position type of damper motor may be substituted in place of the proportioning type illustrated and that corresponding change may be made in the controllers of thermostat 19. I prefer to utilize a proportioning motor however as this provides for obtaining an adjustable minimum position for the fresh air damper. It will also be apparent that pneumatic controls may be utilized instead of electric if so desired.

While I have shown and described a preferred form of my invention it will be apparent that many modifications and adaptations of my invention will occur to those skilled in the art. I therefore desired to be limited only by the scope of the appended claims.

I claim as my invention:

1. In a system of the class described, in combination, flow control means for controlling the supply of outside air to a space, a first outside temperature influenced thermostatic controller, a second outside temperature influenced thermostatic controller, and space temperature influenced means for selectively placing one or the other of said controllers in control of said flow control means.

2. In a system of the class described, in combination, flow control means for controlling the supply of outside air to a space, a first outside temperature influenced thermostatic controller, said first controller being arranged for controlling said flow controller in a manner to reduce the air flow upon rise in outside temperature, a second outside temperature influenced thermostatic controller, said second controller being arranged to control said flow controller in a manner to reduce the air flow upon fall in outside temperature, and space temperature influenced means for selectively placing one or the other of said controllers in control of said flow control means.

3. In a system of the class described, in combination, flow control means for controlling the supply of outside air to a space, a first outside temperature influenced thermostatic controller, said first controller being arranged for controlling said flow controller in a manner to reduce the air flow upon rise in outside temperature, a second outside temperature influenced thermostatic controller, said second controller being arranged to control said flow controller in a manner to reduce the air flow upon fall in outside temperature, and space temperature influenced means for placing said first controller in control of said flow controller when space temperature is above a predetermined value, while placing said second controller in control of said flow controller when space temperature is below a predetermined value.

4. In a system of the class described, in combination, an air conditioning system for a space including means for heating and cooling said space, thermostatic means for operating said system for heating said space upon demand for heating and for operating said system to cool said space upon demand for cooling, means for supplying outside air to said space, flow control means for varying the supply of outside air, a first outside temperature influenced controller for controlling said flow control means in a manner to reduce the flow of outside air upon rise in outside temperature, a second outside temperature influenced means for controlling said flow control means in a manner to reduce the flow of outside air upon fall in outside temperature, and selective control means operative to place said first control means in control of said flow control means when said space is being cooled and to place said second control means in control of said flow control means when said space is being heated.

5. In a system of the class described, in combination, flow control means for controlling the supply of outside air to a space, an outside temperature influenced thermostatic device for controlling said flow controller, and space temperature influenced means for reversing the relationship between said outside temperature influenced thermostatic device and said flow control means.

6. In a system of the class described, in combination, flow control means for controlling the supply of outside air to a space, an outside temperature influenced thermostatic device, and space temperature influenced means for simultaneously changing the temperature setting of said outside temperature influenced thermostatic device and reversing the relationship between said outside temperature influenced thermostatic device and said flow control means.

7. In a system of the class described, in combination, flow control means for controlling the supply of outside air to a space, an outside temperature influenced thermostatic device, a space temperature influenced thermostatic controller, and connections between said outside temperature influenced thermostatic controller and said flow controller, reversing means associated with said outside temperature influenced controller, said reversing means being controlled by said space temperature influenced thermostatic means in a manner to condition said outside temperature influenced thermostatic device for reducing the flow of outside air upon rise in outside temperature when space temperature is above a predetermined value, and for reducing the flow of outside air upon fall in outside temperature when space temperature is below a predetermined value.

8. In a system of the class described, in combination, an air conditioning system for a space including means for heating and cooling said space, thermostatic means for operating said system for heating said space upon demand for heating and for operating said system to cool said space upon demand for cooling, means for supplying outside air to said space, flow control means for varying the supply of outside air, an outside temperature influenced thermostatic controller for controlling said flow control means, reversing means associated with said thermostatic controller for reversing the action thereof upon said flow control means, and means for controlling said reversing means in a manner to cause said thermostatic controller to cause decrease in air flow upon decrease in outside temperature when said space is being heated, while causing said thermostatic controller to cause decrease in air flow upon increase in outside temperature when said space is being cooled.

9. In a system of the class described, in combination, an air conditioning system for a space including means for heating and cooling said space, thermostatic means for operating said system for heating said space upon demand for heating and for operating said system to cool said space upon demand for cooling, means for supplying outside air to said space, flow control means for varying the supply of outside air, an outside temperature influenced thermostatic controller for controlling said flow control means, reversing means associated with said thermostatic controller for changing the temperature setting thereof and reversing its action upon said flow control means, and means for controlling said reversing means in a manner to lower the temperature setting of said thermostatic controller and to condition it for reducing the flow of outside air upon fall in outside temperature when said space is being heated, while raising the temperature setting of said thermostatic controller and conditioning it to cause decrease in the flow of outside air upon rise in outside temperature when said space is being cooled.

10. In a system of the class described, in combination, a conditioner for heating and cooling air supplied to a conditioned space, means for supplying a stream of fresh air to said conditioner, means for supplying a stream of return air from said space to said conditioner, damper means for controlling the relative proportions of the fresh and return air streams, first and second controllers actuated in accordance with the temperature of one of said air streams, said first controller acting to increase the proportion of fresh air upon temperature rise and said second controller acting to increase the proportion of fresh air upon temperature fall, and thermostatic means responsive to the temperature of the other air stream for selectively placing either said first controller or said second controller in control of said damper means.

11. In a system of the class described, in combination, a conditioner for heating and cooling air supplied to a conditioned space, means for supplying a stream of fresh air to said conditioner, means for supplying a stream of return air from said space to said conditioner, damper means for controlling the relative proportions of the fresh and return air streams, a first thermostatic device responsive to the temperature of one of said air streams for controlling said damper means, connections between said first thermostatic device and said damper means, reversing means in said connections for reversing the effect of said first thermostatic device on said damper means, and a second thermostatic device responsive to the temperature of the other air stream for controlling said reversing means.

12. In a system of the class described, in combination, a conditioner for heating and cooling air supplied to a conditioned space, means for supplying a stream of fresh air to said conditioner, means for supplying a stream of return air from said space to said conditioner, damper means for controlling the relative proportions of the fresh and return air streams, a first thermostatic device responsive to the temperature of one of said air streams for controlling said damper means, connections between said first thermostatic device and said damper means, reversing means in said connections for reversing the effect of said first thermostatic device on said damper means, and a second thermostatic device responsive to the temperature of the other air stream for controlling said reversing means, said second thermostatic device acting upon rise in temperature above a predetermined value to cause said first thermostatic device to decrease the proportion of fresh air as the temperature at said first thermostatic device increases.

13. In a system of the class described, in combination, a conditioner for heating and cooling air supplied to a conditioned space, means for supplying a stream of fresh air to said conditioner, means for supplying a stream of return air from said space to said conditioner, damper means for controlling the relative proportions of the fresh and return air streams, a first thermostatic device responsive to the temperature of one of said air streams for controlling said damper means, and means including a second thermostatic device responsive to the temperature of the other air stream for reversing the operation and adjusting the setting of said first thermostatic device.

14. In a system of the class described, in combination, a conditioner for heating and cooling air supplied to a conditioned space, means for supplying a stream of fresh air to said conditioner, means for supplying a stream of return air from said space to said conditioner, damper means for controlling the relative proportions of the fresh and return air streams, a reversible electric motor for positioning said damper means, said reversible electric motor having a three wire control circuit, said three wire control circuit including a common wire, a first control wire which is adapted in cooperation with said common wire to cause said motor to operate in one direction and a second control wire which is adapted in cooperation with said common wire to cause said motor to operate in the opposite direction, a first thermostatic current controlling means responsive to the temperature of one of the air streams and connected into said control circuit, reversing switching means interposed in said control circuit for reversing the effect of said first thermostatic electric current controlling means on said motor, and thermostatic switching means responsive to the temperature of the other of said air streams for controlling said reversing means.

FRANCIS C. MILLER.